(12) United States Patent
Kodali et al.

(10) Patent No.: US 10,091,115 B2
(45) Date of Patent: Oct. 2, 2018

(54) HANDLING VOICE AND NON-VOICE DATA UNDER UPLINK LIMITED CONDITIONS

(71) Applicant: Apple Inc., Cupertino, CA (US)

(72) Inventors: Sree Ram Kodali, Sunnyvale, CA (US); Shivesh Makharia, San Jose, CA (US); Longda Xing, San Jose, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 15/078,748

(22) Filed: Mar. 23, 2016

(65) Prior Publication Data

US 2017/0279727 A1    Sep. 28, 2017

(51) Int. Cl.
| | | |
|---|---|---|
| *H04L 12/853* | (2013.01) | |
| *H04L 1/18* | (2006.01) | |
| *H04L 29/06* | (2006.01) | |
| *H04W 28/02* | (2009.01) | |
| *H04W 72/12* | (2009.01) | |

(52) U.S. Cl.
CPC ........ *H04L 47/2416* (2013.01); *H04L 1/1812* (2013.01); *H04L 1/1887* (2013.01); *H04L 65/608* (2013.01); *H04W 28/0236* (2013.01); *H04W 72/1242* (2013.01); *H04W 72/1268* (2013.01); *H04W 28/0252* (2013.01)

(58) Field of Classification Search
CPC . H04L 47/2416; H04L 1/1812; H04L 65/608; H04L 47/14; H04L 47/00; H04L 47/10; H04L 47/11; H04L 47/24; H04L 47/2408; H04L 47/2441; H04L 47/80; H04L 47/801; H04L 47/805; H04W 28/0236; H04W 72/1268; H04W 72/1242; H04W 28/02; H04W 28/00; H04W 28/0205; H04W 28/0231; H04W 28/0284; H04W 28/0289; H04W 72/00; H04W 72/02; H04W 72/12; H04W 72/1205; H04W 72/1226–72/1236; H04W 72/1247; H04W 72/1263; H04W 72/085
USPC ........................................................ 370/230
See application file for complete search history.

(56) References Cited

U.S. PATENT DOCUMENTS

| | | | |
|---|---|---|---|
| 8,009,581 B2 | 8/2011 | Frenger et al. | |
| 9,408,104 B1 * | 8/2016 | Vivanco | H04W 28/0205 |
| 9,894,614 B2 * | 2/2018 | Su | H04W 52/0261 |

(Continued)

FOREIGN PATENT DOCUMENTS

| | | |
|---|---|---|
| WO | 2001008426 A2 | 2/2001 |
| WO | 2008147315 A1 | 12/2008 |

*Primary Examiner* — Mark H Rinehart
*Assistant Examiner* — Kenneth P Hunt
(74) *Attorney, Agent, or Firm* — Meyertons Hood Kivlin Kowert & Goetzel, P.C.; Jeffrey C. Hood (57) ABSTRACT

This disclosure relates to techniques for handling voice and data under uplink limited conditions in a wireless communication system. A wireless device and a base station may establish a wireless communication link. Transmission time interval bundling (TTI-B) may be enabled for uplink communications between the wireless device and the base station. It may be determined that the wireless device is experiencing uplink limited conditions. One or more rules prioritizing a first type of data over a second type of data for uplink communications may be enabled based on TTI-B being enabled and the wireless device experiencing uplink limited conditions.

20 Claims, 5 Drawing Sheets

(56) References Cited

U.S. PATENT DOCUMENTS

| | | | |
|---|---|---|---|
| 2014/0146763 A1* | 5/2014 | Khay-Ibbat | H04W 72/1236 370/329 |
| 2016/0192376 A1* | 6/2016 | Lee | H04W 48/20 370/252 |
| 2017/0149546 A1* | 5/2017 | Zhang | H04L 5/0053 |

* cited by examiner

HANDLING VOICE AND NON-VOICE DATA UNDER UPLINK LIMITED CONDITIONS

FIELD

The present application relates to wireless devices, and more particularly to systems, methods, and apparatuses for handling voice and non-voice data under uplink limited conditions in a wireless communication system.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Many wireless communication standards are used for both voice and non-voice data services. There are, however, numerous challenges to providing both voice data services and non-voice data services via the same communication link. For example, it may be challenging to provide good connection quality for packet-switched voice data communications, particularly in poor RF conditions, and even more so if the packet-switched communication link is also used to provide non-voice data services, since both of those factors may potentially reduce the throughput of the communication link available for voice data communications. Accordingly, improvements in wireless communications would be desirable.

SUMMARY

Embodiments are presented herein of, inter alia, systems, methods, and apparatuses for handling voice and non-voice data under uplink limited conditions in a wireless communication system.

According to some embodiments, a base station and a wireless device may establish a wireless communication link according to a wireless communication technology. The base station and wireless device may determine to enable transmission time interval (TTI) bundling for uplink communications between the wireless device and the base station. TTI bundling may be enabled for any of a variety of reasons, and may provide more robust uplink communication characteristics, e.g., in response to uplink limited conditions. For example, TTI bundling may be enabled in order to compensate for the limited transmit power available. As another possibility, if a communication channel is experiencing degraded channel conditions, and/or experiences substantial signal attenuation as a qualitative characteristic of the communication channel, TTI bundling may be enabled to compensate for such considerations. Other reasons (including combinations of the above reasons and/or additional reasons) may also provide the basis for TTI bundling to be enabled.

In some instances, additional conditions further indicative of and/or responsive to an uplink limited scenario may occur and/or be implemented, and may be determined to be present by the wireless device. For example, in some instances, poor link quality may lead to small uplink grants (e.g., resulting from a low/robust modulation and coding scheme allocation), which may in turn result in packet segmentation at the radio link control (RLC) layer. As an example scenario, if realtime transfer protocol (RTP) voice packets that are generated every 20 ms during talkspurts of a voice call are segmented into three RLC packets each, and each of those RLC packets is transmitted using TTI bundling, potentially 12 out of every 20 ms may be occupied, leaving little flexibility for HARQ retransmissions, signaling, other data types, etc. As another example scenario, even if RLC segmentation is not occurring, if there are TTI bundling HARQ retransmissions, the uplink timeline may become very tight, potentially leaving few TTIs unoccupied by uplink transmissions.

In such scenarios, if care is not taken, it is possible that delay tolerant data (e.g., internet data) may in some instances be transmitted at the expense of delay sensitive data (e.g., voice data). According to the techniques described herein, such scenarios may be recognized and measures to prioritize delay sensitive data over delay tolerant data under uplink limited conditions may be implemented.

For example, if a wireless device is experiencing uplink limited conditions and TTI bundling is already enabled, one or more rules may be implemented to prioritize delay sensitive data over delay tolerant data. One such possible rule may include limiting uplink transmissions of non-voice data to silence periods during a voice call under selected circumstances. Another possible rule may include preferentially blanking uplink transmissions of delay tolerant data over uplink transmissions of delay sensitive data if uplink transmission blanking is required based on specific absorption rate (SAR) regulations under selected circumstances. Other additional or alternative rules are also possible.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
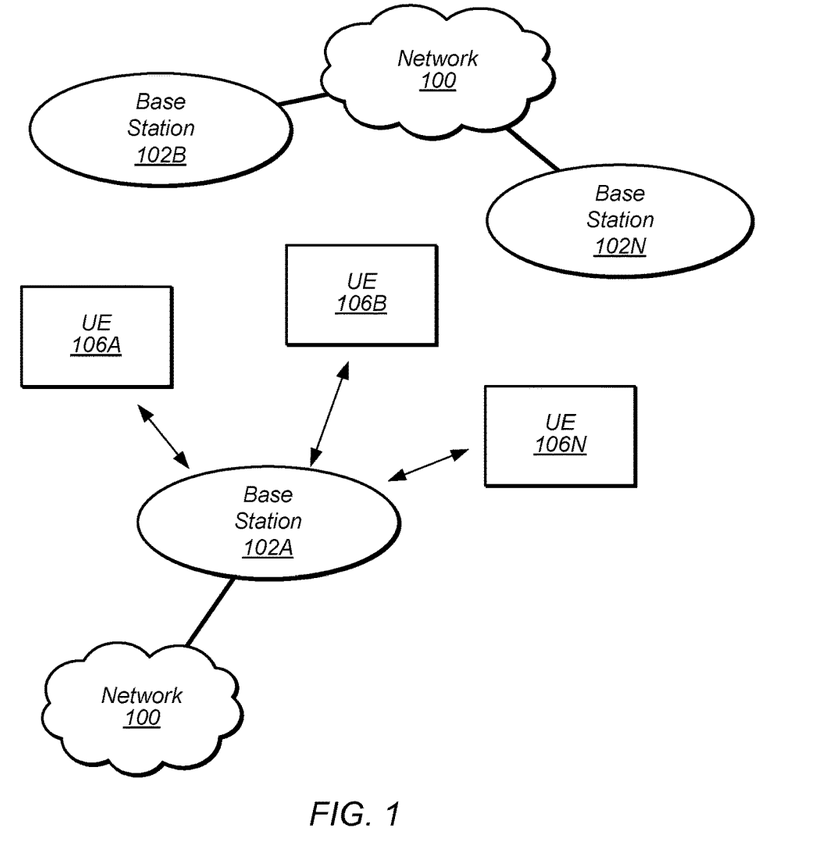
FIG. 1 illustrates an exemplary (and simplified) wireless communication system, according to some embodiments.
Figure 2:
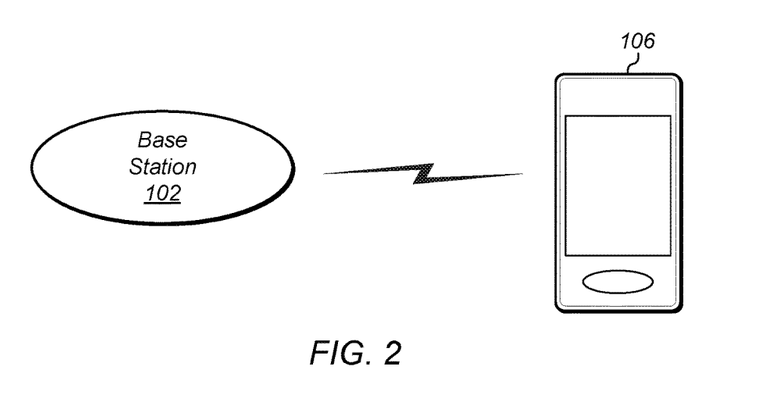
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or UMTS or GSM), and separate radios for communicating using each of Wi-Fi and Bluetooth. Other configurations are also possible.

Figure 3:
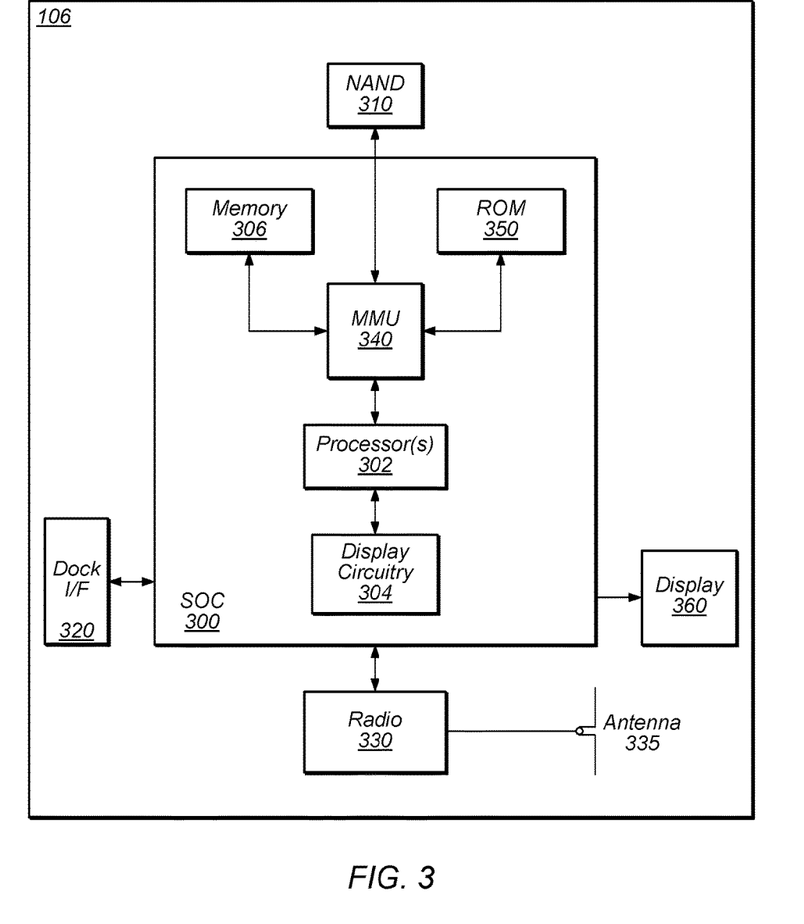
FIG. 3 illustrates an exemplary block diagram of a UE device, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector OF 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for handling voice and non-voice data during uplink limited conditions, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
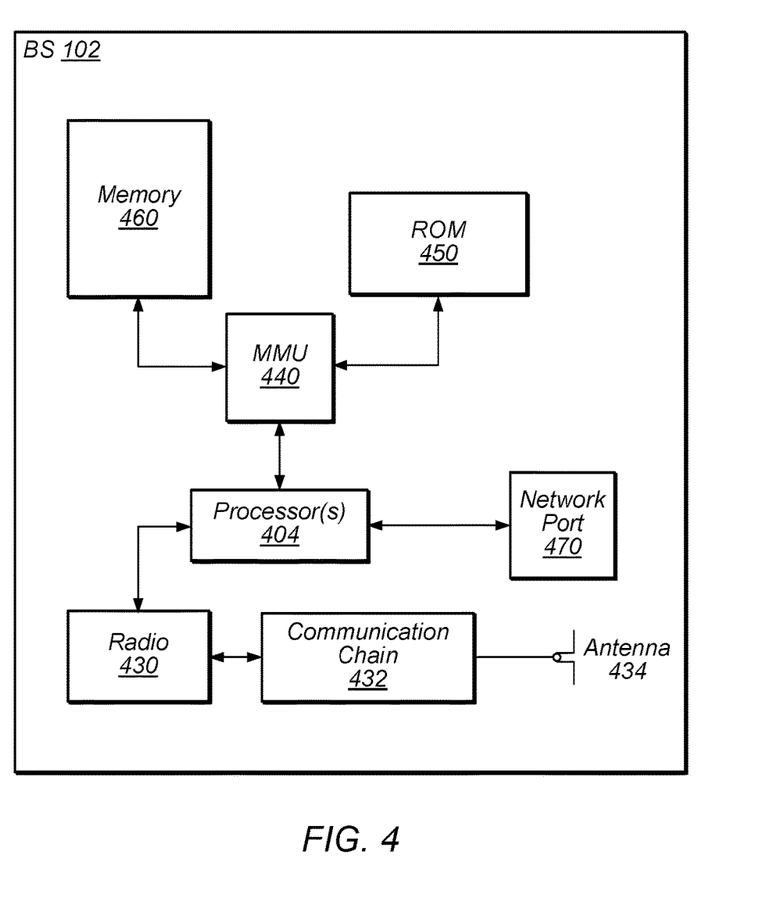
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

As described further subsequently herein, the BS 102 may include hardware and software components for implementing features for handling voice and non-voice data under uplink limited conditions, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 6.

Figure 5:
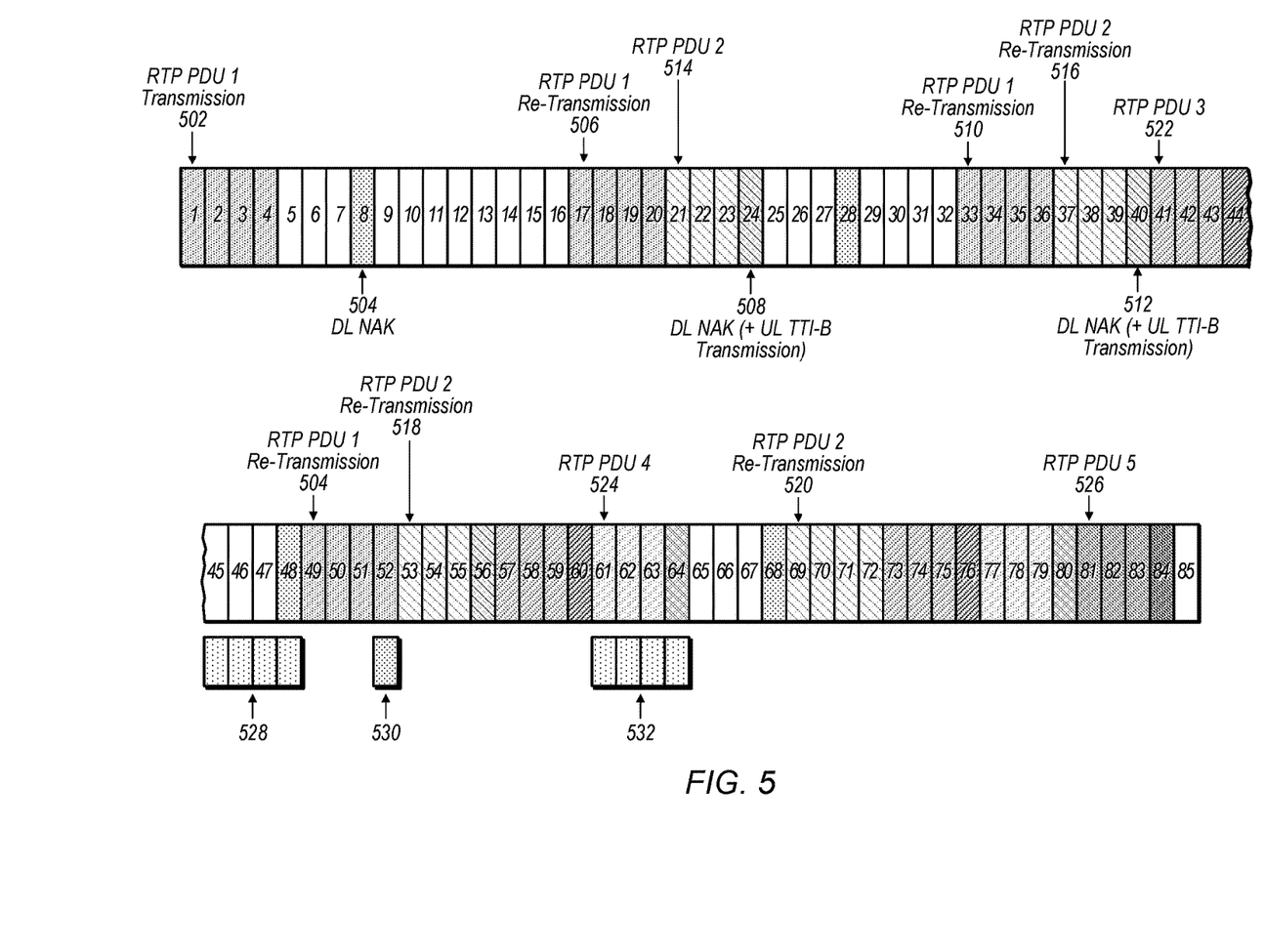
FIG. 5 illustrates an exemplary uplink transmission time interval bundling timeline, according to some embodiments.

FIG. 5—Example TTI Bundling Timeline

TTI bundling (TTI-B) may be a modification of a Hybrid Automatic Repeat Request (HARQ) feature that may be implemented at the media access control (MAC) layer of a device according to some wireless communication technologies. Typically the use of HARQ may include waiting for an acknowledgement (ACK) or negative ACK (NACK or NAK) after a first transmission attempt, and if it is determined that the first transmission attempt was unsuccessful, performing a HARQ retransmission. This may be repeated up to a certain (e.g., network configured maximum) number of retransmissions. In the case of TTI bundling, instead of waiting for an ACK/NAK before performing a HARQ retransmission, multiple HARQ transmissions of a single packet may be performed in successive TTIs. This feature may provide very robust packetized transmissions with low latency, which may be useful for traffic types with strict latency and/or reliability requirements (such as voice communications) in difficult RF conditions. Note that, at least in some instances, a TTI bundle may be ACK/NAK'd as a bundle, and one or more TTI bundle HARQ retransmissions may be performed for a TTI bundle that is not successfully received.

FIG. 5 illustrates an example timeline of uplink communications by a wireless device while TTI-B is enabled, according to some embodiments. In the illustrated example, 85 TTIs (or subframes) are shown of a scenario in which an uplink real time transfer protocol (RTP) packet (e.g., providing voice data as part of a voice call) is generated every 20 ms. Note that FIG. 5 and the description thereof are provided by way of example, and are not intended to be limiting to the disclosure as a whole. Numerous alternatives to and variations of the details provided herein below are possible and should be considered within the scope of the present disclosure.

As shown, a first RTP packet may be transmitted at the first subframe (502). As TTI-B is configured in the illustrated example, the first RTP packet may be repeated (e.g., with different HARQ redundancy versions) in subframes 2, 3, and 4. The first RTP packet may not be successfully received by the base station, and so a downlink negative acknowledgement (DL NAK) may be received in subframe 8 (504). The first RTP packet may accordingly be retransmitted (e.g., as another TTI bundle) over subframes 17-20 (506). Up to 16 HARQ retransmissions (e.g., four sets of TTI bundles) are configured in the illustrated example, and so further DL NAKs for the first RTP packet may occur in subframes 24 (508) and 40 (512), and corresponding further retransmissions of the first RTP packet may occur in subframes 33-36 (510) and 49-52 (512), as shown.

A second RTP packet may be transmitted with a similar timeline beginning at subframes 21-24 (514) and retransmissions at subframes 37-40 (516), 53-56 (518), and 69-72 (520). A third RTP packet, again following a similar timeline, may initially be transmitted in subframes 41-44 (522), while a fourth RTP packet may initially be transmitted in subframes 61-64 (524), and a fifth RTP packet may initially be transmitted in subframes 81-84 (526).

As no uplink transmissions occur in this exemplary timeline between subframes 45-48, it is possible that delay tolerant data could be transmitted at this time (528). However, if the data is not successfully received by the base station, the wireless device may receive a NAK at subframe 52 (530), which may result in re-transmissions of the delay tolerant data being scheduled at subframes 61-64 (532). If retransmissions are prioritized over new transmissions (as may be common at least in some systems, as HARQ re-transmissions may have a greater chance for successful packet decoding than new transmissions resulting from the benefit of combining procedures), this may result in the delay tolerant data being preferred by the network over a new transmission of the fourth RTP packet. The quality of the voice call may suffer in such a case, possibly without any substantial benefit elsewhere (e.g., as it may have been possible for the delay tolerant data to have been transmitted at another time without substantially affecting user experience, because of its characteristic delay tolerance).

Figure 6:
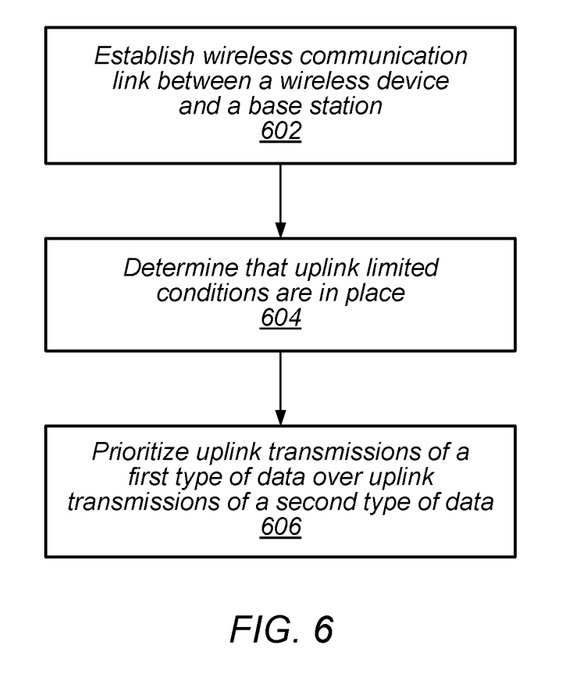
FIG. 6 is a flowchart diagram illustrating an exemplary method for handling voice and data under uplink limited conditions in a wireless communication system, according to some embodiments.

FIG. 6—Communication Flow Diagram

As illustrated in the example scenario of FIG. 5, under uplink limited conditions when TTI-B is enabled and TTI-B HARQ retransmissions are occurring, the uplink timeline may become tightly scheduled. As previously noted, in many instances networks may prefer to allow re-transmission at the HARQ level over new transmissions; for example, if a HARQ re-transmission would normally occur at a particular subframe, the network may choose to schedule that HARQ re-transmission over scheduling a new transmission at that subframe. If the re-transmission is for delay tolerant data (e.g., internet data) and the initial transmission is for delay sensitive data (e.g., voice data), the application using the delay sensitive data may suffer (e.g., voice quality of a voice call may suffer). The situation can be exacerbated if radio link control (RLC) segmentation of higher layer packets is occurring in conjunction with TTI-B and/or frequent TTI-B HARQ retransmissions, as this may further add to the number of uplink transmissions desired and crowd the uplink transmission timeline.

Accordingly, it would be useful to provide techniques for appropriately prioritizing uplink transmissions by a wireless device under uplink limited conditions. FIG. 6 is a flowchart diagram illustrating such a scheme. The scheme illustrated in FIG. 6 may be used in conjunction with uplink transmission time interval (TTI) bundling. The scheme shown in FIG. 6 may be used in conjunction with any of the computer systems or devices shown in the above Figures, among other devices. According to some embodiments, the method may be implemented by a base station (e.g., a BS 102 such as illustrated in and described with respect to FIGS. 1-2 and 4). As another possibility, the method may be implemented by a wireless device (e.g., a UE 106 such as illustrated in and described with respect to FIGS. 1-3).

In various embodiments, some of the elements of the scheme shown may be performed concurrently, in a different order than shown, substituted for by other elements, or may be omitted. Additional elements may also be performed as desired. As shown, the scheme may operate as follows.

In 602, a wireless communication link may be established between a wireless device and a base station. The wireless communication link may be established according to a first wireless communication technology (or "radio access technology" or "RAT"), such as LTE, UMTS, CDMA2000, etc.

The wireless communication link may provide the wireless device with a communication link to a cellular network, such as a core network of a cellular service provider (e.g., with which a user of the wireless device may have a subscription and/or other agreement to provide cellular service). The cellular network may thus provide connectivity between the user device and various services and/or devices coupled to the cellular network, such as other user devices, a public switched telephone network, the Internet, various cloud-based services, etc. A variety of possible data types, with different characteristics, may be transmitted using the wireless communication link. In addition, various signaling messages may be exchanged at various times to establish, maintain, reconfigure, and/or otherwise provide signaling functionality for the wireless communication link and the layers and protocols supporting the wireless communication link.

In 604, it may be determined that the wireless device is experiencing uplink limited conditions. This may be determined by either or both of the wireless device or the base station. According to some embodiments, uplink limited conditions may be characterized by a large proportion (e.g., a proportion over a threshold) of transmission time intervals being occupied by uplink transmissions by the wireless device. In some instances, uplink limited conditions may result from and/or be associated with poor wireless medium conditions, limited uplink transmit power (e.g., due to device design constraints and/or regulations), and/or other factors.

As one possibility, the wireless device and/or base station may determine that uplink limited conditions are occurring based on measurements indicative of medium conditions (e.g., one or more of uplink sounding reference signal (SRS) results, downlink reference signal received power (RSRP) and reference signal received quality (RSRQ), etc.). For example, if one or more designated indicators of signal strength and/or signal quality are below a certain threshold or thresholds, this may be provide a basis for determining that uplink limited conditions are present.

In some instances, certain features may be implemented (either implicitly or explicitly) in response to uplink limited conditions. For example, as previously noted, a wireless device and a base station may enable TTI bundling under uplink limited conditions, e.g., as a low latency technique to improve the chances of successful reception of delay sensitive data (such as voice data) when the likelihood of successful reception after a single transmission is not considered sufficient.

As previously noted, in some instances, transmission of a packet using TTI bundling may not result in successful reception after a single TTI bundle. In such a case, one or more HARQ retransmissions (e.g., as needed, up to a configured maximum number of possible HARQ retransmissions) of a TTI bundle may be performed.

As another possible feature, RLC segmentation may occur under uplink limited conditions, for example if a low modulation and coding scheme grant provides insufficient throughput to transmit a higher layer (e.g., RTP, PDCP, etc.) packet in a single TTI. In such a case, the wireless device may split a higher layer packet into multiple RLC packets at the RLC layer, each of which may be transmitted (and retransmitted, if necessary) at different TTIs.

In some instances, the wireless device and/or base station may determine whether uplink conditions are limited based on how fully occupied uplink transmission time intervals are, and/or based on characteristics indicative of or responsive to uplink limited conditions occurring, such as whether TTI bundling is enabled, how much RLC segmentation is occurring (e.g., whether it is over an RLC segmentation threshold), how many HARQ retransmissions are occurring (e.g., whether it is over a HARQ retransmission threshold), or some combination thereof.

For example, as one possibility, the wireless device may determine that the wireless device is experiencing uplink limited conditions if, while uplink TTI bundling is enabled, either or both of uplink radio link control (RLC) bearer packet segmentation above a RLC segmentation threshold has occurred or a number of uplink hybrid automatic repeat request (HARQ) retransmissions above a HARQ retransmission threshold have occurred.

As another possibility, the base station may determine that the wireless device is experiencing uplink limited conditions if uplink TTI bundling is enabled. If desired, the amount of RLC segmentation and/or HARQ retransmissions performed by the wireless device may also be taken into consideration by the base station.

In 606, uplink transmissions of a first type or category (or group of types or categories) of data may be prioritized over uplink transmissions of a second type or category (or group of types or categories) of data. According to some embodiments, the first type of data may include delay sensitive data, while the second type of data may include delay tolerant data. For example, the first type of data may include voice data (e.g., RTP voice data) and signaling (e.g., radio resource control (RRC) signaling, non access stratum (NAS) signaling, internet protocol multimedia subsystem (IMS) signaling, etc.), while the second type of data may include non-voice data (e.g., other packet data convergence protocol (PDCP) data). Other definitions of the first and second types of data are also possible.

Such prioritization may be enabled based on the wireless device experiencing uplink limited conditions, and may remain in place until it is determined that uplink limited conditions are no longer in place for the wireless device (e.g., based on any or all of TTI bundling being disabled, HARQ retransmissions falling below a threshold, RLC segmentation falling below a threshold, an uplink MCS allocation above a threshold being granted, signal strength/quality indicators rising above a threshold, etc., depending on the implementation).

Prioritization of the first type of data over the second type of data may also depend on whether different categories of data are present, according to some embodiments. For instance, if only the first type of data is present (e.g., a voice call is occurring and no background data is buffered, according to some embodiments), or if only the second type of data is present (e.g., if no voice call is occurring, according to some embodiments), there may be no need to implement techniques prioritizing the first type of data over the second type of data.

Prioritizing the first type of data over a second type of data for the wireless device's uplink communications with the base station may include enabling one or more rules at the wireless device, as one possibility. For example, as one possibility, if a voice call is active, the second type of data may be transmitted only during voice uplink silence periods. In other words, the second type of data may be buffered by the wireless device such that its transmission is deferred during uplink talkspurts of the voice call, and allowed during uplink silence periods of the voice call.

According to some embodiments, the wireless device may occasionally need to blank some uplink transmissions due to specific absorption ratio (SAR) regulations. Some wireless devices may be capable of transmitting at a maximum power level that, if used continuously, would exceed regulated SAR limits. Such power levels may be used judiciously, e.g., in poor wireless medium conditions and/or cell edge scenarios in which transmissions may not be received by the destination base station if higher transmit power levels are not used. To ensure SAR regulation compliance, such a wireless device may limit the number of subframes in which uplink transmissions are performed in such circumstances, in order to avoid exceeding the regulated SAR limits in aggregate. Those subframes in which no transmissions are performed due to SAR regulations may be referred to as blanked subframes or blanked uplink transmissions. Thus, as another possibility for prioritizing the first type of data over the second type of data, the wireless device may enable preferentially blanking uplink transmissions of the second type of data over blanking uplink transmissions of the first type of data if uplink transmission blanking based on SAR regulations is required.

As an additional or alternative possibility, according to some embodiments, the base station may implement one or more features to prioritize uplink transmissions of the first type of data over uplink transmissions of the second type of data by the wireless device under uplink limited conditions. For example, different bearers (e.g., RLC unacknowledged mode (UM) bearers) may be configured for the wireless device for different types of data. Thus, a first bearer could be established, e.g., as a prioritized bit rate bearer, for the first type of data. A second (and possibly a third, fourth, etc.) bearer (e.g., that may not be a prioritized bit rate bearer) could be established for the second type of data. Under uplink limited conditions (or potentially uplink limited conditions), such as when TTI bundling is enabled, the base station may suspend (e.g., in at least the uplink and possibly also the downlink) the second bearer (and possibly any other bearers for data of the second type/non prioritized bit rate bearers).

According to some embodiments, the base station may provide the wireless device with an indication to suspend the second bearer, if it is determined to suspend the second bearer. Similarly, if the base station determines to resume the second bearer (e.g., once TTI bundling is disabled and/or there is no prioritized bit rate bearer active), the base station may provide the wireless device with an indication to resume the second barrier.

Thus, techniques for prioritizing delay sensitive data over delay tolerant data at a wireless device when the wireless device is experiencing uplink limited conditions may be implemented at either or both of the base station or the wireless device. As previously noted, such techniques may improve user experience, at least according to some embodiments, by attempting to keep delays to delay sensitive data at a minimum.

Note that while several exemplary techniques and possible rules for prioritizing data transmissions during uplink limited conditions have been discussed herein, this disclosure is not intended to be limited to those techniques and rules specifically discussed, and other techniques and rules for prioritizing data transmissions during uplink limited conditions are also possible and should be considered within the scope of the disclosure.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station (BS), comprising:
a radio; and
a processing element operably coupled to the radio;
wherein the radio and the processing element are configured to:
establish a wireless communication link with a wireless user equipment (UE) device,
establish a first bearer with the UE device, wherein the first bearer is a prioritized bit rate bearer;
establish a second bearer with the UE device, wherein the second bearer is not a prioritized bit rate bearer;
enable transmission time interval (TTI) bundling for UE device uplink communications;
determine that a number of hybrid automatic repeat request (HARQ) retransmissions occurring exceeds a threshold; and
suspend the second bearer while the first bearer is active and TTI bundling is enabled for UE device uplink communications based on the determination that the number of HARQ retransmissions occurring exceeds the threshold, the first bearer being a prioritized bit rate bearer, the second bearer not being a prioritized bit rate bearer, and TTI bundling being enabled for UE device uplink communications.

2. The BS of claim 1,
wherein the first bearer is used for voice communications,
wherein the second bearer is used for non-voice communications.

3. The BS of claim 1, wherein the radio and the processing element are further configured to:
provide an indication to the UE device to suspend the second bearer while the first bearer is active and TTI bundling is enabled for UE device uplink communications.

4. The BS of claim 1,
wherein the second bearer is suspended for both uplink and downlink communications while the first bearer is active and TTI bundling is enabled for UE device uplink communications.

5. The BS of claim 1, wherein the radio and the processing element are further configured to:
resume the second bearer if no prioritized bit rate bearer is active, if the number of HARQ retransmissions no longer exceeds the threshold, or if TTI bundling is no longer enabled for UE device uplink communications.

6. The BS of claim 1, wherein the radio and the processing element are further configured to:
establish a third bearer with the UE device, wherein the third bearer is not a prioritized bit rate bearer; and
suspend the third bearer while the first bearer is active and TTI bundling is enabled for UE device uplink communications based on the first bearer being a prioritized bit rate bearer, the third bearer not being a prioritized bit rate bearer, and TTI bundling being enabled for UE device uplink communications.

7. The BS of claim 1,
wherein TTI bundling comprises bundling multiple subframes having different HARQ redundancy versions in a transmission instance using multiple consecutive TTIs.

8. A method for operating a base station, the method comprising:
establishing a first bearer and a second bearer for uplink communication with a user equipment (UE) device, wherein the first bearer is for delay sensitive data and wherein the second bearer is for delay tolerant data;
determining that an amount of radio link control (RLC) segmentation exceeds a threshold; and
in response to said determining, suspending the second bearer.

9. The method of claim 8, wherein the delay sensitive data comprises signaling.

10. The method of claim 8, wherein the delay sensitive data comprises voice data.

11. The method of claim 8, the method further comprising:
enabling transmission time interval (TTI) bundling for UE device uplink communications.

12. The method of claim 11, wherein said enabling is in response to said determining.

13. The method of claim 11, wherein said suspending is further based on one or more indicators of signal strength or signal quality.

14. An apparatus, comprising a processing element and a memory medium configured to cause a base station to:
establish a wireless communication link with a user equipment (UE) device;
establish a first bearer and a second bearer for uplink communication with the UE device, wherein the first bearer is for a first type of data and wherein the second bearer is for a second type of data;
enable transmission time interval (TTI) bundling for uplink communications with the UE device;
determine that a number of hybrid automatic repeat request (HARQ) retransmissions occurring exceeds a threshold; and
suspend the second bearer based on TTI bundling being enabled and determining that the number of hybrid automatic repeat request (HARQ) retransmissions occurring exceeds the threshold.

15. The apparatus of claim 14,
wherein the first type of data comprises real time transfer protocol (RTP) voice data,
wherein the second type of data comprises packet data convergence protocol (PDCP) non-voice data.

16. The apparatus of claim 15, wherein the first type of data further comprises one or more of radio resource control signaling, non-access stratum (NAS) signaling, and/or internet protocol multimedia subsystem (IMS) signaling.

17. The apparatus of claim 14, wherein the processing element and the memory medium are further configured to cause the base station to:
determine that the number of HARQ retransmissions occurring no longer exceeds the threshold and/or that TTI bundling for uplink communications is no longer enabled; and
resume the second bearer in response to determining that the number of HARQ retransmissions occurring no longer exceeds the threshold and/or that TTI bundling for uplink communications is no longer enabled.

18. The apparatus of claim 17, wherein the processing element and the memory medium are further configured to cause the base station to:
based on TTI bundling being enabled and determining that the number of HARQ retransmissions occurring exceeds the threshold, provide an indication to the UE device to suspend the second bearer; and
in response to determining that the number of HARQ retransmissions occurring no longer exceeds the threshold and/or that TTI bundling for uplink communications with the base station is no longer enabled, provide an indication to the UE device to resume the second bearer.

19. The apparatus of claim 14, wherein the second bearer is suspended for both uplink and downlink communications while TTI bundling is enabled and the number of HARQ retransmissions occurring exceeds the threshold.

20. The apparatus of claim 14, wherein suspending the second bearer is further based on at least one of:
uplink radio link control (RLC) segmentation, or
uplink hybrid automatic repeat request (HARQ) retransmissions.

* * * * *